United States Patent
Howard (10) Patent No.: US 9,007,017 B2
(45) Date of Patent: Apr. 14, 2015

(54) INTELLIGENT BATTERY MANAGEMENT METHOD AND DEVICE

(75) Inventor: Jason N. Howard, Alpharetta, GA (US)

(73) Assignee: Google Technology Holdings LLC, Mountain View, CA (US)

( * ) Notice: Subject to any disclaimer, the term of this patent is extended or adjusted under 35 U.S.C. 154(b) by 374 days.

(21) Appl. No.: 13/452,968

(22) Filed: Apr. 23, 2012

(65) Prior Publication Data

US 2013/0278204 A1    Oct. 24, 2013

(51) Int. Cl.
     *H01R 13/62*      (2006.01)
     *H02J 7/00*      (2006.01)
     *H02J 7/02*      (2006.01)

(52) U.S. Cl.
     CPC .............. *H02J 7/0054* (2013.01); *H02J 7/0004* (2013.01); *H02J 7/02* (2013.01); *H02J 2007/0096* (2013.01)

(58) Field of Classification Search
     CPC ........ H01F 38/14; H01F 5/003; H02J 7/0004; H02J 7/0027; H02J 7/025; H02J 7/00; F24F 11/0086; F24F 2011/0091; F24F 2221/32; F24F 11/0009; F24F 2011/0049; F24F 2011/0064; B25J 5/00
     USPC ................................................ 320/104–109
     See application file for complete search history.

(56) References Cited

U.S. PATENT DOCUMENTS

| | | | |
|---|---|---|---|
| 5,689,654 A | 11/1997 | Kikinis et al. | |
| 6,029,119 A | 2/2000 | Atkinson | |
| 6,823,415 B1 | 11/2004 | Asaad et al. | |
| 7,849,250 B2 | 12/2010 | Diener et al. | |
| 7,986,123 B2 | 7/2011 | Idzik et al. | |
| 8,000,098 B1 | 8/2011 | Sinha | |
| 8,629,654 B2 * | 1/2014 | Partovi et al. | 320/108 |
| 2002/0122298 A1 | 9/2002 | Cohen et al. | |
| 2003/0040344 A1 | 2/2003 | Shteyn et al. | |
| 2006/0258409 A1 | 11/2006 | Kogan | |
| 2006/0279250 A1 | 12/2006 | Keely et al. | |
| 2007/0024242 A1 | 2/2007 | Seo et al. | |
| 2009/0096413 A1 * | 4/2009 | Partovi et al. | 320/108 |

FOREIGN PATENT DOCUMENTS

| | | |
|---|---|---|
| WO | 9850994 A1 | 11/1998 |
| WO | 2009144370 A1 | 12/2009 |

OTHER PUBLICATIONS

Patent Cooperation Treaty, International Search Report and Written Opinion of the International Searching Authority for International Application No. PCT/US2013/035194, Feb. 26, 2014, 12 pages.
International Bureau of WIPO, International Preliminary Report on Patentability in International Patent Application PCT/US2013/035194 (Nov. 6, 2014).

* cited by examiner

*Primary Examiner* — Binh Tat
(74) *Attorney, Agent, or Firm* — Leydig, Voit & Mayer, Ltd.

(57) ABSTRACT

An intelligent battery management method (300) and device (600). The method (300) can include the steps of: monitoring (310) parameters including at least a wireless communication device battery temperature and battery state of charge and a dock battery state of charge; comparing (320) the monitored parameters with a decision matrix; and enabling (330) at least one of charging and cooling a wireless communication device battery based on the compared parameters and the decision matrix. The method (300) can provide active charging and cooling, which can help to prolong the useful life of a battery and provide a maximum recharging capacity.

19 Claims, 7 Drawing Sheets

| FIG. 4 |
|---|
| FIG. 4A |
| FIG. 4B |

EXAMPLE BATTERY LIMITS:
NORMAL CHARGE < 45°C
REPLENISHMENT CHARGE TO 4.0 V (70% SOC) AT 45° TO 60°C
NO CHARGING ALLOWED > 60°C

| PHONE BATTERY TEMPERATURE | PHONE BATTERY SOC | | | DOCK BATTERY SOC | | |
|---|---|---|---|---|---|---|
| | HIGH >70% | MED 30%-70% | LOW <30% | HIGH >70% | MED 30%-70% | LOW <30% |
| HIGH >60°C | | | | | | |
| MED 45°C-60°C | | | | | | |
| LOW <45°C | | | | | | |

| PHONE BATT. TEMP. T* | SOC, PHONE | SOC, DOCK | NORMAL CHARGING? | REPLENISH CHARGING? | ENGAGE ACTIVE COOLING? | COMMENTS |
|---|---|---|---|---|---|---|
| L | H | H | Y | N | N | T* NORMAL, NO NEED FOR ACTIVE COOLING. ENABLE TOP-OFF CHARGING FROM DOCK, UNLESS DOCK SOC IS LOW |
| L | H | M | Y | N | N | |
| L | H | L | N | N | N | |
| M | H | H | N | N | Y | T* WILL ONLY ALLOW "REPLENISH" CHARGE UNLESS TEMP IS REDUCED. PHONE SOC IS ALREADY ABOVE REPLENISHMENT LIMIT. COOLING ENABLED TO ALLOW NORMAL CHARGE TO MAX PHONE CAPACITY, BUT ONLY WHEN DOCK SOC IS "HIGH" |
| M | H | M | N | N | N | |
| M | H | L | N | N | N | |
| H | H | H | N | N | Y | T* IS ABOVE LIMIT FOR ANY CHARGING. PHONE SOC IS ALREADY ABOVE REPLENISHMENT LIMIT. ENABLING COOLING/CHARGING IS NOT EFFICIENT USE OF DOCK BATTERY CAPACITY. COOLING TO PROTECT BATTERY CYCLE LIFE MAY BE WORTHWHILE |
| H | H | M | N | N | N | |
| H | H | L | N | N | N | |

FIG. 4A

| | | | | | |
|---|---|---|---|---|---|
| L | M | H | Y | N | T* NORMAL, NO NEED FOR ACTIVE COOLING. ENABLE TOP-OFF CHARGING FROM DOCK, UNLESS DOCK SOC IS LOW |
| L | M | M | Y | N | |
| L | M | L | N | N | |
| M | M | H | N | Y | T* WILL ONLY ALLOW "REPLENISH" CHARGE UNLESS TEMP IS REDUCED. PHONE SOC IS BELOW REPLENISHMENT LIMIT. AT THIS TEMP. AND PHONE SOC, NOTHING GAINED FROM COOLING |
| M | M | M | N | Y | |
| M | M | L | N | N | |
| M | H | H | N | N | T* IS ABOVE LIMIT FOR ANY CHARGING. PHONE SOC IS BELOW REPLENISHMENT LIMIT. ENABLING COOLING TO BRING PHONE BATTERY TEMPERATURE BACK DOWN INTO REPLENISHMENT CHARGING RANGE (UNLESS DOCK CAPACITY IS LOW) |
| M | H | M | N | Y | |
| M | H | L | N | N | |
| L | L | H | Y | N | T* NORMAL, ENGAGE CHARGING, EVEN WITH DOCK SOC LOW |
| L | L | M | Y | N | |
| L | L | L | Y | N | |
| M | L | H | N | Y | T* WILL ONLY ALLOW "REPLENISH" CHARGE UNLESS TEMPERATURE IS REDUCED. PHONE SOC IS BELOW REPLENISHMENT LIMIT. AT THIS TEMPERATURE AND PHONE SOC, NOTHING GAINED FROM COOLING |
| M | L | M | N | Y | |
| M | L | L | N | Y | |
| H | L | H | N | Y | PHONE SOC IS LOW, MUST COOL PHONE BATTERY TO ENABLE CHARGING |
| H | L | M | N | Y | |
| H | L | L | N | Y | |

FIG. 6

INTELLIGENT BATTERY MANAGEMENT METHOD AND DEVICE

BACKGROUND

1. Field

The present disclosure relates to an intelligent battery management method and device.

2. Introduction

Wireless communication devices, such as smartphones and the like, are now being paired with docks or cradles, to allow a laptop or tablet user experience, without needing a separate device, see for example, Motorola's Lapdock 500 Pro. The wireless communication device contains a processor, memory, and communications function, and the dock can provide a larger screen and user interface, such as a keyboard.

The wireless communication device and the dock can be powered by separate batteries. The size of the dock allows incorporation of larger and higher capacity batteries. It is desirable to allow a dock to recharge a battery operated electronic device, such as a wireless communication device. However, a wireless communication device inserted into a dock may lack sufficient cooling to keep the temperature below the thermal charging limits imposed by the wireless communication device battery. There is need to intelligently trade-off thermal management and power management between a dock and a battery operated electronic device.

There is a need for enhanced management of cooling and charging of battery operated electronic devices, such as wireless communication devices.

There is also a need to enhance the thermal management of battery-to-battery charging of a battery operated electronic device with a battery powered dock.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
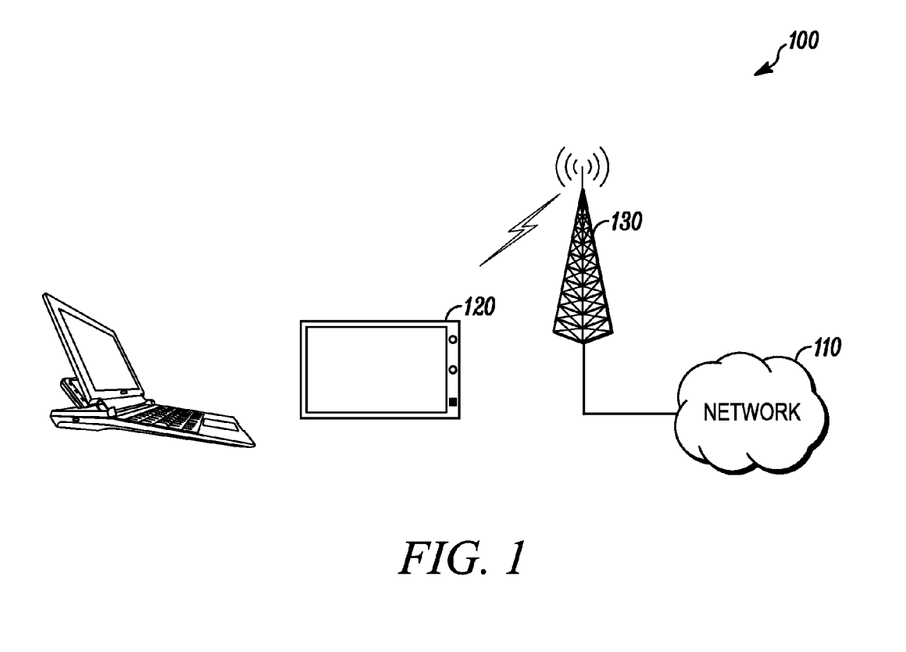
FIG. 1 is an exemplary block diagram of a communication system including a wireless communication device shown undocked and one shown docked according to one embodiment.

FIG. 1 is an exemplary block diagram of a system 100 according to one embodiment. The system 100 can include a network 110, a terminal 120, and a base station 130. The terminal 120 may be a wireless communication device, such as a wireless telephone, a cellular telephone, a tablet, a personal digital assistant, a pager, a personal computer, a selective call receiver, or any other device that is capable of sending and receiving communication signals on a network including a wireless network. The network 110 may include any type of network that is capable of sending and receiving signals, such as wireless signals. For example, the network 110 may include a wireless telecommunications network, a cellular telephone network, a Time Division Multiple Access (TDMA) network, a Code Division Multiple Access (CDMA) network, a Third Generation (3G) network, a satellite communications network, and other like communications systems. More generally, network 110 may include a Wide Area Network (WAN), a Local Area Network (LAN) and/or a Personal Area Network (PAN). Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals. In operation, the terminal 120 can communicate with the network 110 and with other devices on the network 110 by sending and receiving wireless signals via the base station 130, which may also comprise local area, and/or personal area access points.

Figure 2:
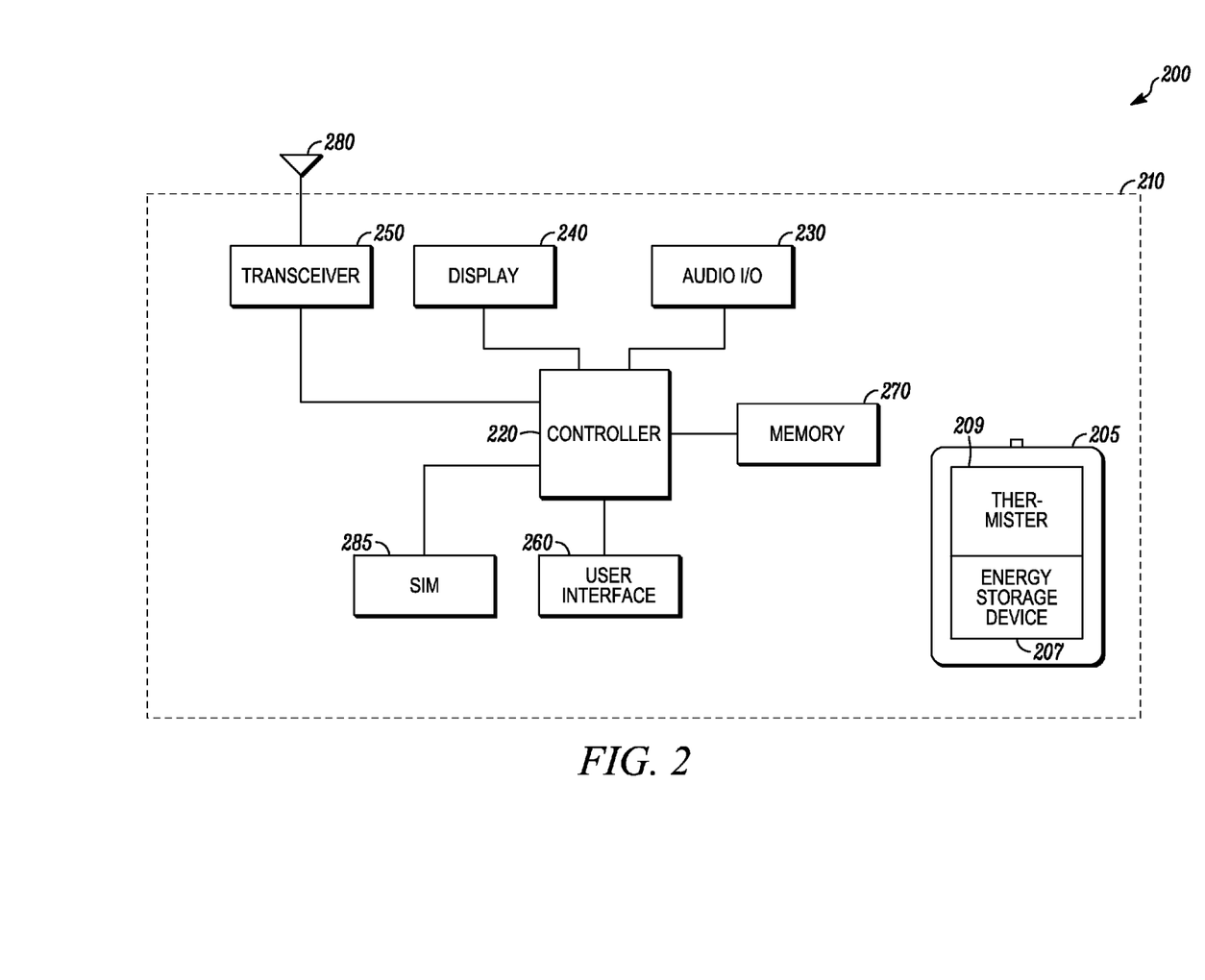
FIG. 2 is an exemplary block diagram of a wireless communication device according to one embodiment.

FIG. 2 is an exemplary block diagram of a wireless communication device 200 configured with an energy storage device or module 205, such as the terminal 120, according to one embodiment. The energy storage module 205 can include an energy storage device 207, such as a lithium ion battery, and a thermister 209. These components can be integral to the energy storage module 205, proximally located within energy storage module 205 as depicted in FIG. 2, or can be separately located in the wireless communication device 200. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, an antenna 280 coupled to the housing 210 and the transceiver 250, and a removable subscriber module 285 coupled to the controller 220.

The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory or any other memory that can be coupled to a wireless communication device.

Figure 3:
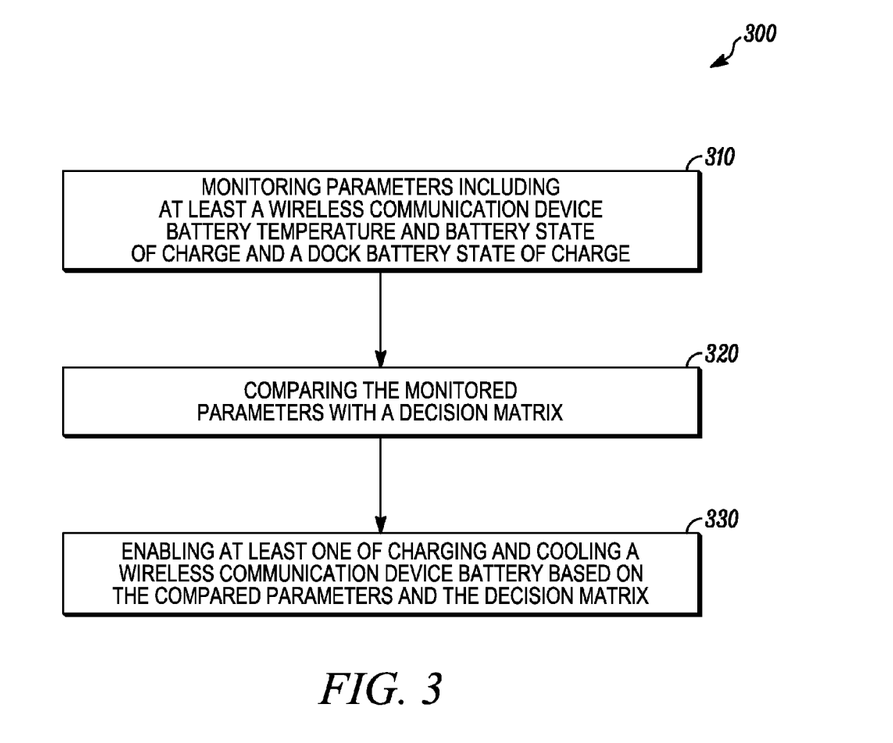
FIG. 3 is an exemplary block diagram of an intelligent battery management method according to one embodiment.

In its simplest form, an intelligent battery management method 300 is shown in FIG. 3. The method 300 can include the steps of: monitoring 310 parameters including at least a wireless communication device battery temperature and battery state of charge and a dock battery state of charge; comparing 320 the monitored parameters with a decision matrix; and enabling 330 at least one of charging and cooling a wireless communication device battery based on the compared parameters and the decision matrix. The method 300 can automatically and dynamically manage, charging and cooling, within tight specifications and tolerances, as desired. This can help to prolong the useful life of a battery and help to maintain its maximum recharging capacity.

Figure 6:
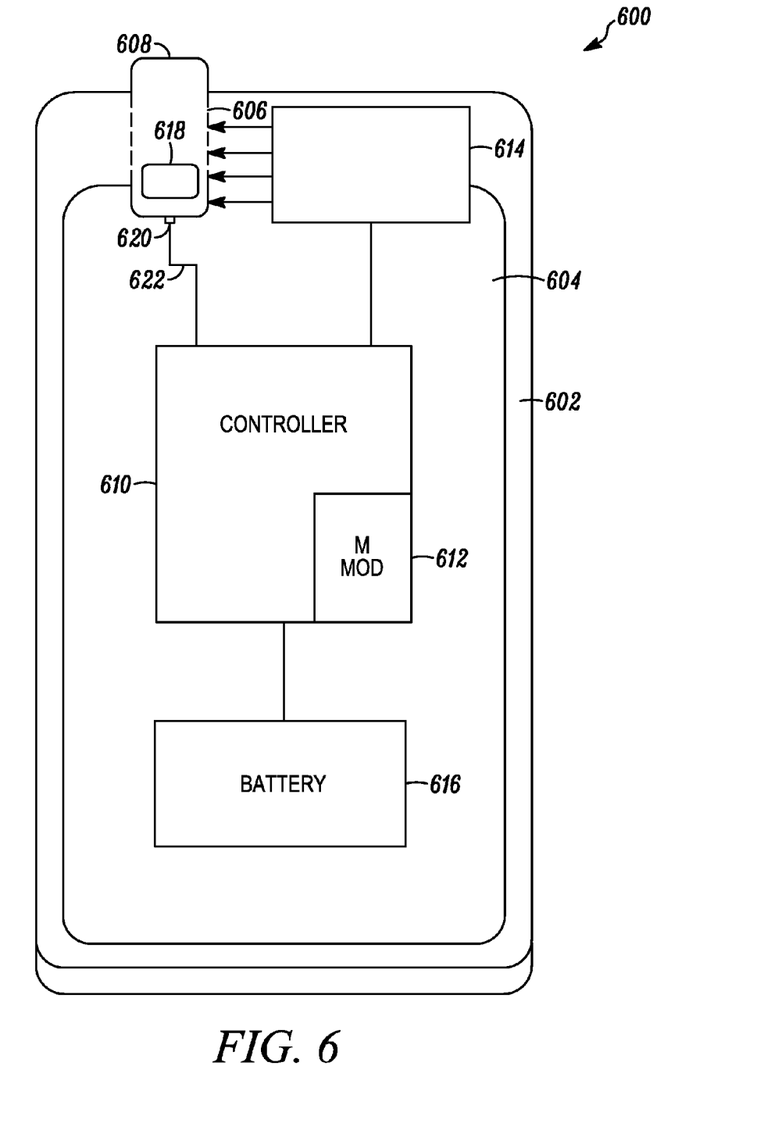
FIG. 6 is an exemplary block diagram of an intelligent battery management device according to one embodiment.

The method 300 can further include connecting a wireless communication device with a docking station. For example, the wireless communication device, such as a phone, can be easily installed or inserted into a cradle or dock, as shown in FIGS. 1 and 6.

Figure 5:
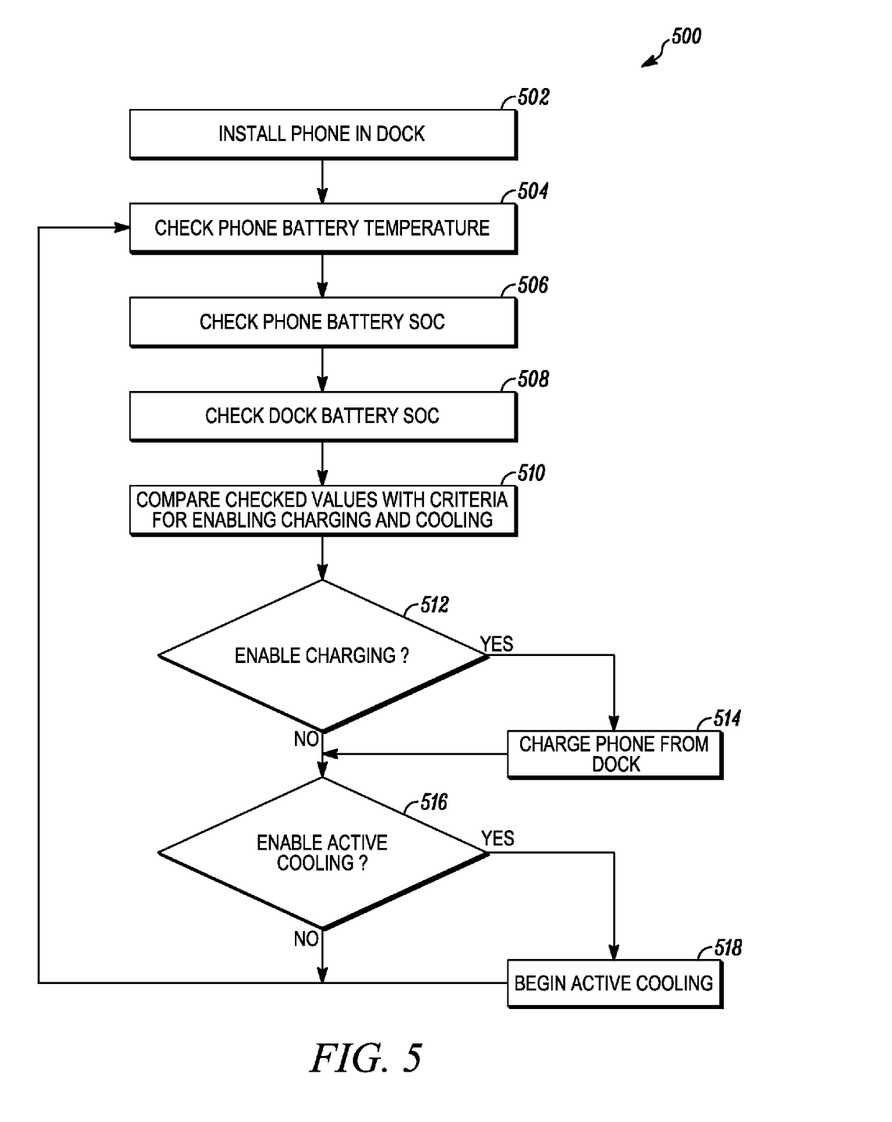
FIG. 5 is an exemplary flow diagram of an intelligent battery management method according to one embodiment.

The method 300 can further include sensing a connection of a wireless communication device with a docking station. For example, a sensor can sense when a wireless communication device is docked, installed or inserted into a cradle or dock. When this is accomplished, the method 300 can be cycled or triggered on, as shown in FIG. 5, for example. As should be understood, the sensing can vary widely. For example, it could include a proximity sensor, USB sensor and the like.

The method 300 can include active cooling, when appropriate, as detailed in connection with the decision matrix in FIG. 4. In more detail, the active cooling can include at least one of fan, liquid circulator pump, and Peltier device. For example, the active cooling can include liquid circulation or a fan directing an air stream at a wireless communication device battery, as detailed herein.

The monitoring parameters step 310 can include dynamically monitoring the battery temperature and battery state of charge of the wireless communication device and dynamically monitoring the dock battery state of charge, to quickly determine whether or not to charge or cool the wireless communication device battery, as detailed herein in connection with the decision matrix.

Figures 4, 4A:
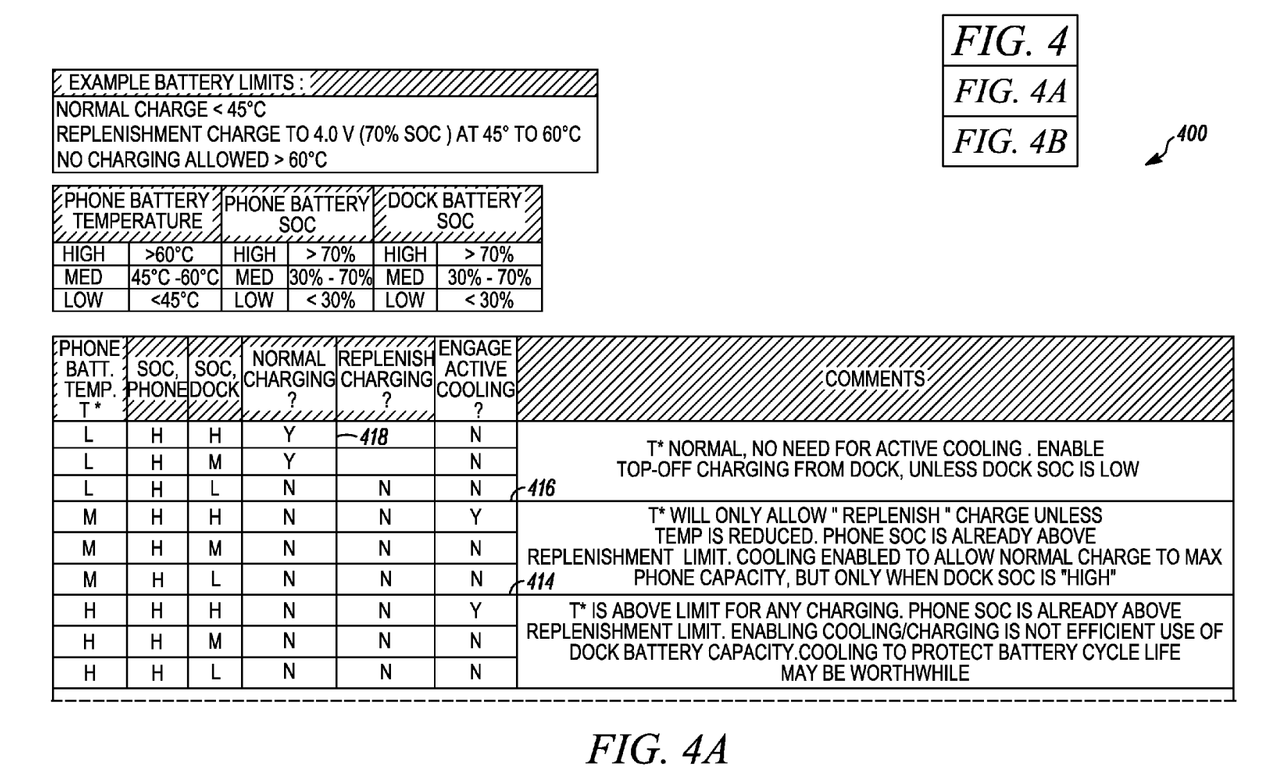
FIG. 4 is an exemplary decision matrix for use in connection with an intelligent battery management method and device according to one embodiment.
Figure 4B:
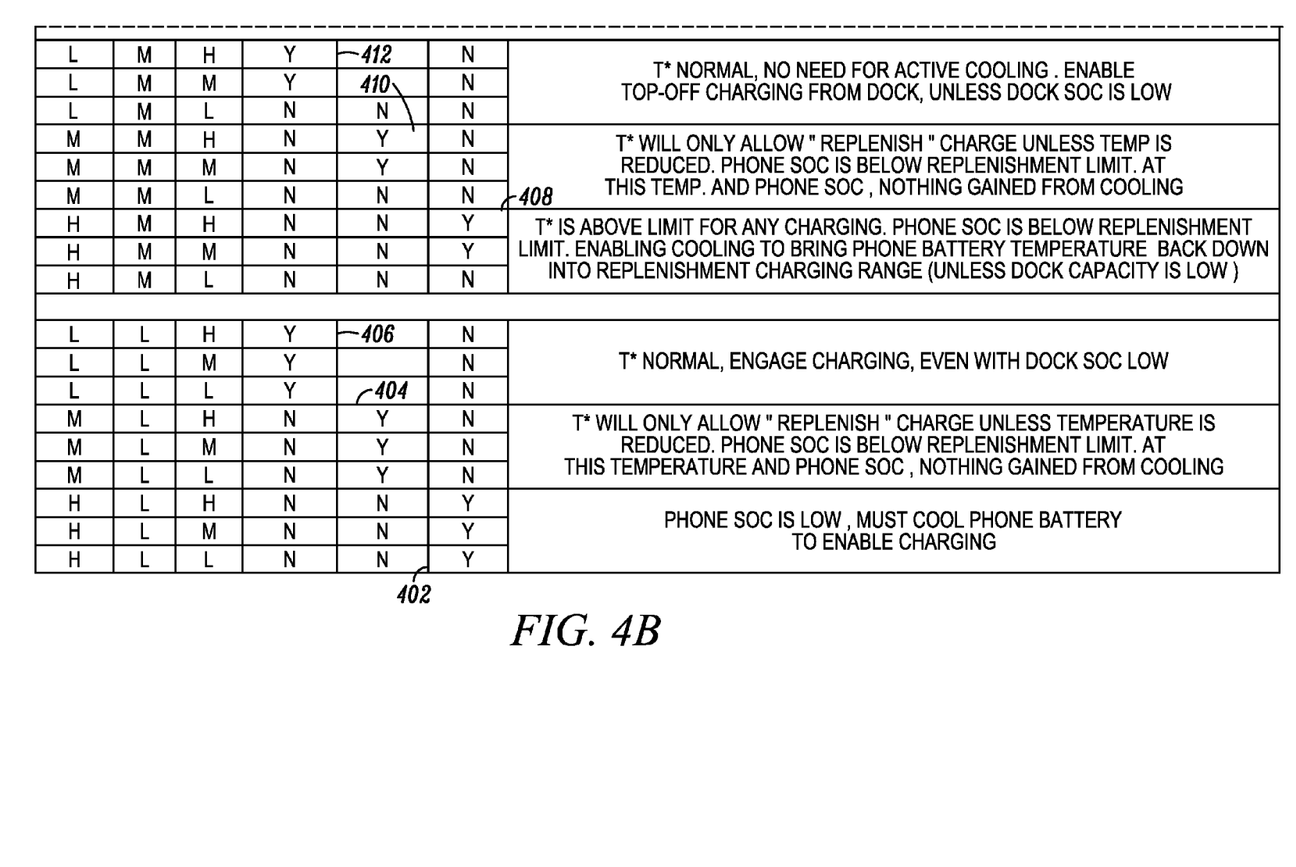

As shown in the decision matrix in FIG. 4, (i) the battery temperature includes a low temperature range, a medium temperature range and a high temperature range, (ii) the battery state of charge of the wireless communication device includes a low state of charge range, a medium state of charge range and a high state of charge range and (iii) the dock battery state of charge includes a low state of charge range, a medium state of charge range and a high state of charge range. The specific temperatures and state of charge percentages are shown and detailed in FIG. 4. As should be understood, these are exemplary, and can vary widely.

The decision matrix in FIG. 4, provides a number of examples of how the method 300 can work, as detailed below.

For example, the decision matrix 400 allows active cooling when the wireless communication device battery temperature value is high and the battery state of charge of the wireless communication device value is low, at example one 402.

The decision matrix 400 allows replenish charging when the wireless communication device battery temperature value is medium and the battery state of charge of the wireless communication device value is low, at example two 404.

The decision matrix 400 allows charging when the wireless communication device battery temperature value is low and the battery state of charge of the wireless communication device value is low, at example three 406.

The decision matrix 400 allows active cooling when the wireless communication device battery temperature value is high and the dock battery state of charge value is not low, at example four 408.

The decision matrix 400 allows replenish charging when the wireless communication device battery temperature value is medium and the battery state of charge of the wireless communication device value is medium, at example five 410.

The decision matrix 400 allows charging when the wireless communication device battery temperature value is low and the battery state of charge of the wireless com, at example six 412.

The decision matrix 400 allows active cooling when the wireless communication device battery temperature value is high and the battery state of charge of the wireless communication device value is high and dock battery state of charge is high, at example seven 414.

The decision matrix 400 allows active cooling when the wireless communication device battery temperature value is medium and the battery state of charge of the wireless communication device value is high and dock battery state of charge is high, at example eight 416.

The decision matrix 400 allows charging when the wireless communication device battery temperature value is low and the battery state of charge of the wireless communication device value is high and dock battery state of charge is not low, at example nine 418. This can provide topping off.

Advantageously, the decision matrix 400 or algorithm, enables and disables charging and active cooling based on the state of charge (SOC) and temperatures of the dock battery and the wireless communication device battery. This algorithm and the above examples, can help to prolong the useful life a battery and can help to provide a charged battery when needed.

In FIG. 5, a simplified exemplary flow diagram of an intelligent battery management method 500, is shown. At block 502, a phone is installed in a dock or cradle, to begin the method. At block 504, a phone battery temperature is checked. At block 506, the state of charge of the phone battery is checked. At block 508, the state of charge of the dock is checked. At block 510, the checked values are compared with the criteria for enabling charging and cooling, as previously detailed. Next, a decision diamond 512 is reached, and the question is whether to enable charging. If yes, the phone battery is charged from the dock. If no or after a predetermined charge, a decision diamond 516 is reached, and the question is whether to enable active cooling. If yes, active cooling is begun at block 518. If no, or after predetermined cooling, the check phone battery temperature block is restarted.

An exemplary intelligent battery management device 600, is shown in FIG. 6. The device 600 can include: a housing 602 and display 604, a dock 606 configured to receive an electronic device 608; a controller 610 coupled to the device 600, the controller 610 configured to control the operations of the device 600; and a management module 612 configured to: monitor parameters including at least a wireless communication device battery temperature and battery state of charge and a dock battery state of charge; compare the monitored parameters with a decision matrix; and enable at least one of charging and cooling a wireless communication device battery based on the compared parameters and the decision matrix.

The device 600 also shows a cooling device 614 in proximity to the electronic device 608, a dock battery 616 connected to the controller 610 and electronic device battery 618 also connected to the controller 610 via a connection, such as a USB connector 620 and line 622, for example. The management module 612 also includes charging circuitry to charge the electronic device battery 118. In one embodiment, the electronic device 608 can be a wireless communication device, such as a cellphone, and the housing 602 can include a tablet, such as a Xoom by Motorola or iPad by Apple, as should be understood. The housing 602 can include all the components shown and described in connection with FIG. 2, in one embodiment.

The management module 612 can include a plurality of monitoring devices. For example, it can include a thermister for ascertaining a battery temperature of an electronic device, a proximity sensor for ascertaining whether the dock is populated or not, Coulomb counter for determining the state of charge of the battery of the electronic device and Coulomb counter for determining the state of charge of the dock battery.

The cooling device 614 can include at least one of a fan, a liquid circulator pump and a Peltier device. The cooling device 614 is strategically positioned and aligned for enhanced flow, liquid circulation, etc. as the case may be. As detailed previously, cooling and charging can be activated, based on the compared parameters and the decision matrix of the management module 612.

The management module 612 can also be configured with charging circuitry and components, to charge the electronic device battery 618, via line 622. This occurs according to the compared parameters and the decision matrix, as detailed with respect to FIG. 4.

Advantageously, an efficient and intelligent method and device for charging and cooling of a battery operated electronic device is provided. This can be accomplished by using active cooling powered by a dock battery or AC connected to a dock, to charge a battery operated electronic device.

In one embodiment, the device 600 can have a display 604 and keyboard. In one embodiment, the device 600 itself and its battery 616 are substantially larger and has a greater capacity than the battery 618 of the electronic device 608. This allows the dock to recharge the phone.

In a lap dock use case, the phone is the primary device, and the dock is an accessory. In the important use case, it is more desirable to the user, that the phone battery 618 be maintained at the highest state of charge possible. Since the phone contains the main processor and communications in a lap dock use case, significant current drain and heat, is generated in a phone. Advantageously, active cooling and strategic charging, as detailed herein can be quite attractive. A dock is substantially larger than a smartphone and could more easily incorporate an active cooling system aimed at cooling the installed phone. Again, the larger battery in the dock is more likely to have sufficient capacity to support some amount of active cooling.

As detailed herein, described is a means of intelligently managing the cumulative stored energy in dock and phone batteries. The approach described helps ensure that a battery operated device, such as a phone will have a substantial state of charge after operating in a docking station. Active cooling in a dock allows charging a battery operated device such as a phone under a wide range of circumstances. By monitoring the phone battery temperature, phone state of charge, and dock state of charge, intelligent decisions can be made about whether or not to trade off dock battery capacity (through cooling and/or charging) in order to charge the phone.

The devices 200 and 600 and methods 300 and 500 are preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

I claim:

1. An intelligent battery management method, comprising:
    determining a first value corresponding to a battery temperature of a wireless communication device;
    determining a second value corresponding to a battery state of charge of the wireless communication device;
    determining a third value corresponding to a battery state of charge of a docking station coupled to the wireless communication device;
    comparing the first, second, and third values with a decision matrix; and
    based on a result of comparing the first, second, and third values with the decision matrix, enabling at least one of charging and cooling a battery included in the wireless communication device from a battery included in the docking station.

2. The intelligent battery management method of claim 1, further comprising connecting the wireless communication device with the docking station.

3. The intelligent battery management method of claim 1, further comprising sensing a connection of the wireless communication device with the docking station.

4. The intelligent battery management method of claim 1, wherein the cooling includes active cooling.

5. The intelligent battery management method of claim 1, wherein the cooling includes active cooling including at least one of fan, liquid circulator pump and Peltier device.

6. The intelligent battery management method of claim 1, further comprising:
    dynamically monitoring the battery temperature and the battery state of charge of the wireless communication device, and
    dynamically monitoring the battery state of charge of the docketing station.

7. The intelligent battery management method of claim 6, wherein:
the battery temperature includes a low temperature range, a medium temperature range, and a high temperature range,
the battery state of charge of the wireless communication device includes a low state of charge range, a medium state of charge range, and a high state of charge range, and
the battery state of charge of the docketing station includes a low state of charge range, a medium state of charge range, and a high state of charge range.

8. The intelligent battery management method of claim 1, wherein the first value is one of high, medium, or low, and the second value is one of high, medium, or low;
wherein the decision matrix allows active cooling the wireless communication device when the first value is high and the second value is low.

9. The intelligent battery management method of claim 1, wherein the first value is one of high, medium, or low, and the second value is one of high, medium, or low;
wherein the decision matrix allows replenish charging the wireless communication device when the first value is medium and the second value is low.

10. The intelligent battery management method of claim 1, wherein the first value is one of high, medium, or low, and the second value is one of high, medium, or low;
wherein the decision matrix allows charging the wireless communication device when the first value is low and the second value is low.

11. The intelligent battery management method of claim 1, wherein the first value is one of high, medium, or low, and the third value is one of high, medium, or low;
wherein the decision matrix allows active cooling the wireless communication device when the first value is high and the third value is not low.

12. The intelligent battery management method of claim 1, wherein the first value is one of high, medium, or low, and the second value is one of high, medium, or low;
wherein the decision matrix allows replenish charging the wireless communication device when the first value is medium and the second value is medium.

13. The intelligent battery management method of claim 1, wherein the first value is one of high, medium, or low, and the second value is one of high, medium, or low, and the third value is one of high, medium, or low,
wherein the decision matrix allows charging the wireless communication device when the first value is low and the second value is medium, provided the third value is not low.

14. The intelligent battery management method of claim 1, wherein the first value is one of high, medium, or low, and the second value is one of high, medium, or low, and the third value is one of high, medium, or low,
wherein the decision matrix allows active cooling the wireless communication device when the first value is high, the second value is high, and the third value is high.

15. The intelligent battery management method of claim 1, wherein the first value is one of high, medium, or low, and the second value is one of high, medium, or low, and the third value is one of high, medium, or low,
wherein the decision matrix allows active cooling the wireless communication device when the first value is medium, the second value is high, and the third value is high.

16. The intelligent battery management method of claim 1, wherein the decision matrix allows charging the wireless communication device when the first value is low, the second value is high, and third value is not low.

17. An intelligent battery management device, comprising:
a first battery;
a dock configured to receive an electronic device, and:
a controller configured to:
determine a first value corresponding to a battery temperature of the electronic device;
determine a second value corresponding to a battery state of charge of the electronic device;
determine a third value corresponding to a battery state of charge of a docking station coupled to the wireless communication device;
compare the first, second, and third values with a decision matrix; and
based on a result of comparing the first, second, and third values with the decision matrix, enable at least one of charging and cooling a second battery included in the electronic device from the first battery included in the intelligent batter management device.

18. The intelligent battery management device of claim 17, further comprising:
a cooling device including at least one of a fan, a liquid circulator pump and a Peltier device to cool the second battery.

19. The intelligent battery management device of claim 17, wherein:
the battery temperature includes a low temperature range, a medium temperature range, and a high temperature range, wherein the first value is one of high, medium, or low;
the battery state of charge of the wireless communication device includes a low state of charge range, a medium state of charge range, and a high state of charge range, wherein the second value is one of high, medium, or low; and
the battery state of charge of the docketing station includes a low state of charge range, a medium state of charge range, and a high state of charge range, wherein the third value is one of high, medium, or low.

* * * * *